United States Patent Office 3,520,839
Patented July 21, 1970

3,520,839
HEXADIENOL AND HEXADIENAL DERIVATIVES
Charles L. Milligan, South Charleston, and Robert J. Ward and Robert A. Martin, Charleston, W. Va., assignors to Union Carbide Corporation, a corporation of New York
No Drawing. Continuation of application Ser. No. 599,700, Dec. 7, 1966. This application Apr. 1, 1969, Ser. No. 812,974
Int. Cl. C07c 43/00; C08g 17/16; C09g 3/00
U.S. Cl. 260—20
4 Claims

ABSTRACT OF THE DISCLOSURE

Derivatives of 2,4-hexadienol are disclosed prepared by ester interchange. The reaction of 2,4-hexadienol with alkylene oxide is disclosed producing hydroxyethers which, in turn, can be esterified with, for instance, drying oil acids. The derivatives can be used as reactive diluents in drying oil coatings formulations.

---

This application is a continuation of Ser. No. 599,700, filed Dec. 7, 1966, and now abandoned.

The invention relates to certain novel derivates of 2,4-hexadienol and of 2,4-hexadienal. In one aspect, the invention relates to novel compositions that can be produced by reacting one equivalent of 2,4-hexadienol with various reactants and to the use of such derivatives in various polymer systems. In another aspect, the invention relates to acetal derivatives of 2,4-hexadienal and to the use of such acetal derivatives in certain polymeric compositions. In still another aspect, the invention relates to novel compositions that can be produced by reacting 2,4-hexadienol with polyfunctional reactants, and to the use of these novel compositions in the production of useful polymers. In a further aspect, the invention relates to various polymeric derivatives of 2,4-hexadienol. In still a further aspect, the invention relates to useful coatings compositions that are derived from certain of the novel compositions of the invention.

In its first aspect, the invention is directed to compositions that are derived by reacting one equivalent of 2,4-hexadienol (commonly called "sorbalcohol") with various types of reactants. Such compositions can be represented by Formula I:

(I) $CH_3(CH=CH)_2CH_2O-(R^2O)_nR^1$ wherein $n$ represents zero or a positive number, wherein $R^2$ represents alkylene of from 2 to 4 carbon atoms, and wherein $R^1$ is formyl, carbonylalkyl, carbonylalkenyl, hydroxyl-substituted carbonylalkenyl, carbonylalkadienyl, carbonylalkatrienyl, carbonylalkatetraenyl, carbonylaryl, carbonylcycloalkyl, carbonylalkaryl, carbonylcycloalkenyl, carbonylbicyclo[2.2.1]heptenyl, carbonylcarboxy, carbonylalkylcarboxy, carbonylalkenylcarboxy, carbonylarylcarboxy, carbonylalkylenehydroxy, carbonylalkyleneamino, N-alkylcarbamyl, N-arylcarbamyl, hydroxyalkyl, cyanoethyl, dihydroxyalkyl, and the like.

Specific illustrative examples of compositions that are within the scope of Formula I when the variable $n$ is zero include 2,4-hexadienyl formate, 2,4-hexadienyl acetate, 2,4-hexadienyl propionate, 2,4-hexadienyl butyrate
2,4-hexadienyl pentanoate
2,4-hexadienyl hexanoate
2,4-hexadienyl heptanoate
2,4-hexadienyl octanoate
2,4-hexadienyl decanoate
2,4-hexadienyl laurate
2,4-hexadienyl myristate
2,4-hexadienyl palmitate
2,4-hexadienyl stearate
2,4-hexadienyl cerotate
2,4-hexadienyl acrylate
2,4-hexadienyl methacrylate
2,4-hexadienyl crotonate
2,4-hexadienyl vinylacetate
2,4-hevadienyl hexenoate
2,4-hexadienyl octenoate
2,4-hexadienyl decenoate
2,4-hexadienyl palmitoleate
2,4-hexadienyl dodecenoate
2,4-hexadienyl oleate
2,4-hexadienyl vaccenate
2,4-hexadienyl ricinoleate
2,4-hexadienyl linoleate
2,4-hexadienyl linolenate
2,4-hexadienyl eleostearate
2,4-hexadienyl licanate
2,4-hexadienyl arachidonate
2,4-hexadienyl benzoate
2,4-hexadienyl cyclohexanecarboxylate
2,4-hexadienyl cyclohexenecarboxylate
2,4-hexadienyl bicyclo[2.2.1] heptenecarboxylate
mono(2,4-hexadienyl) oxalate
mono(2,4-hexadienyl) succinate
mono(2,4-hexadienyl) adipate
mono(2,4-hexadienyl) fumarate
mono(2,4-hexadienyl) maleate
mono(2,4-hexadienyl)phthalate and other esters of 2,4-hexadienol and carboxylic acids. Such esters are preferably prepared by an ester exchange reaction between 2,4-hexadienol and an ester of the desired carboxylic acid and a low boiling alcohol such as methanol or isopropenyl alcohol (which rearranges to the volatile acetone when isopropenyl alcohol is given off from an isopropenyl ester) in the presence of a typical ester exchange catalyst such as sodium methylate, or by the reaction between 2,4-hexadienol and a dicarboxylic acid anhydride under such conditions that only the monoester is formed. The reason that a direct esterification reaction between 2,4-hexadienol and a carboxylic acid group is not preferred is that 2,4-hexadienol can undergo an allylic shift to form 4-hexenal under the more severe conditions of temperature needed in such a direct esterification reaction. However, the problem of allylic shift can be avoided by employing, for instance, an alkylene oxide adduct of 2,4-hexadienol, instead of 2,4-hexadienol itself, to form highly useful esters. Such esters can be represented by Formula I when the $n$ is a positive number, for instance, a number having a value of from 1 to 10 or more, and wherein $R^1$ represents the residue (after removal of the —OH group) of a carboxylic acid. A highly desirable class of compositions within this aspect of the invention are the drying oil acid esters of the alkylene oxide (preferably ethylene oxide, but propylene oxide and butylene oxide are also useful) adducts of 2,4-hexadienol wherein from about 1 to 2 alkylene oxides have been added per mole of 2,4-hexadienol (i.e., wherein $n$ is 1 to about 2). Such drying oil acid esters are particularly useful reactive diluents for air-drying, alkyd-based surface coatings and other drying oil-based coatings compositions.

Additional specific illustrative examples of compositions that are within the scope of Formula I include 2,4-hexadienyl 6-hydroxyhexanoate (formed by reacting epsilon-caprolactone with 2,4-hexadienol in the presence of a catalyst such as stannous octoate), 2,4-hexadienyl 6-aminohexanoate (formed by reacting epsilon-caprolactam with 2,4-hexadienol), and hydroxyalkyleneoxy-2,4-hexadiene and hydroxy(polyalkyleneoxy) - 2,4 - hexadiene (formed by reacting alkylene oxides such as ethylene oxide, propylene oxide and butylene oxide with 2,4-hexadienol in the presence of a catalyst such as potassium hydroxide). Additional compositions that are within the scope of Formula I include 2,4-hexadienyl N-methylcarbamate, 2,4-hexadienyl N-phenylcarbamate, and other carbamates produced by reacting organic isocyanates with 2,4-hexadienol, 2-cyanoethyl 2,4-hexadienyl ether prepared by reacting acrylonitrile with 2,4-hexadienol, 1,3-dihydroxy-2-propyl, 2,4-hexadienyl ether prepared by reacting glycidol with 2,4-hexadienol, and the like.

The compositions that are within the scope of Formula I can be produced by known techniques, as was discussed above. Such compositions have wide utility. For example, the 2,4-hexadienyl moiety contains conjugated unsaturation that can enter into reactions with drying oils, alkyd resins, and the like. Therefore, the compositions within the scope of Formula I can be employed as co-reactants in air-drying surface coating compositions. Since many of the Formula I compositions are liquids, these liquid compositions can be employed in place of some or all of the solvent used in surface coating compositions with a resultant saving in economics and a reduction in the amount of organic material that is evaporated into the atmosphere, thereby reducing air pollution. The carbamates falling within the scope of Formula I have useful insecticidal activity and can be used as intermediates to produce other insecticides. The compositions that are represented by Formula I can be reacted with dienophiles to form additional useful compositions. For example, the product formed by hydrogenating the acrylonitrile Diels-Alder adduct of 2,4-hexadienyl 2-ethylhexoate, that is, 2-carbonitrile-4-methylcyclohexylmethyl 2-ethylhexoate, is a useful plasticizer for vinyl chloride resins. The compositions within the scope of Formula I can be epoxidized by known procedures (such as by reacting with peracetic acid), and the resulting epoxides are useful for producing coatings and molded articles, and as heat and light stabilizer/plasticizers for vinyl chloride resins. The epoxidized long chain (i.e., $C_8$ or more) alkanoic and alkenoic esters of 2,4-hexadienol are especially useful as stabilizer/plasticizers for vinyl chloride polymers.

In a second major aspect, the invention relates to acetals of 2,4-hexadienal (sorbaldehyde). The acetals can be represented by Formula II:

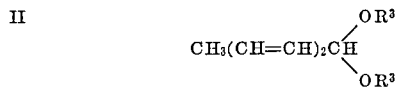

wherein each $R^3$ individually can be alkyl, alkenyl, alkadienyl, alkyleneoxyalkadienyl, alkatrienyl, alkaryl, cycloalkyl, cycloalkenyl, methylbicyclo[2.2.1]heptyl, methylbicyclo[2.2.1] heptenyl, and the like. In addition, the two $R^3$ variable can be taken together with the

moiety to form a five- or six-membered heterocyclic ring. Specific illustrative examples of acetals falling within the scope of Formula II include 1,1-dimethoxy 2,4-hexadiene, 1,1-diethoxy 2,4-hexadiene
1,1-diisopropoxy 2,4-hexadiene
1,1-dibutoxy 2,4-hexadiene
1,1-dipentoxy 2,4-hexadiene
1,1-dihexoxy 2,4-hexadiene
1,1-dioctoxy 2,4-hexadiene
1,1-didecoxy 2,4-hexadiene
1,1-dilauroxy 2,4-hexadiene
1,1-dimyristoxy 2,4-hexadiene
1,1-dipalmitoxy 2,4-hexadiene
1,1-distearoxy 2,4-hexadiene
1,1-diallyloxy 2,4-hexadiene
1,1-dioleyloxy 2,4-hexadiene
1,1-dilinoleyloxy 2,4-hexadiene
1,1-dilinolenylloxy 2,4-hexadiene
1,1-bis(2,4-hexadien-1-oxy) 2,4-hexadiene
1,1-dibenzyloxy 2,4-hexadiene
1,1-dicyclohexyloxy 2,4-hexadiene
1,1-bis(bicyclo[2.2.1]heptylmethyl) 2,4-hexadiene
1,1-bis(bicyclo[2.2.1]hept-3-enylmethyl) 2,4-hexadiene
1,1-bis(2,4-hexadien-1-oxyethyleneoxy) 2,4-hexadiene
2-(1,3-pentadienyl)-1,3-dioxolane, 2-(1,3-pentadienyl)-4-hydroxymethyl-1,3-dioxolane, 2-(1,3 - pentadienyl) - 4-hydroxybutyl-1,3-dioxolane, 2-(1,3-pentadienyl)-5,5-di-(hydroxymethyl)-1,3-dioxane
2-(1,3-pentadienyl)-5-methyl-5-hydroxymethyl-1,3 - dioxane, 2-(1,3-pentadienyl)-5-ethyl-5-hydroxyethyl-1,3-dioxane, 3,9-bis(1,3-pentadienyl)-2,4,8,10 - tetraoxaspiro-[5,5]undecane,
and the like.

The acetals are produced by conventional techniques such as by heating a mixture of 2,4-hexadienal and the apropriate alcohol in the presence of an acid catalyst. When a monohydric alcohol is used, the preferred proportions are about 2 moles of alcohol per mole of 2,4-hexadienal. When a dihydric or trihydric alcohol is employed, equimolar proportions of alcohol and aldehyde are preferably employed in order to produce a 1,3-dioxane or a 1,3-dioxolane. When pentaerythritol is employed as the alcohol, if equimolar proportions are used the product acetal is predominantly 2 - (2,4 - hexadienyl) - 5,5 - di(hydroxymethyl)-1,3-dioxane, and if 2 moles of 2,4-hexadienal per mole of pentaerythritol are used, the acetal is 3,9-bis(2,4-hexadienyl) - 2,4,8,10 - tetraoxaspiro[5.5]undecane. The acetal production is carried out at elevated temperatures (in a solvent such as toluene, if desired) such as 100°–130° C. for from about 1 to 6 hours. The acid catalyst, which can be hydrochloric acid, sulfurci acid, or the like, is employed in catalytic quantities such as from about 0.1 to 2 weight percent, based on weight of reactants. It is desirable to continuously remove water from the reaction mixture. This is conveniently done by azeotropic removal. The completion of the reaction is indicated when water stops coming off. The acetal produced can then be recovered by standard methods such as by fractional distillation.

The acetals are widely useful compositions. For instance, they can be epoxidized by reaction with peracetic acid to form compounds useful as stabilizers for vinyl chloride polymers. The acetals wherein the $R^3$ variables contain olefinic unsaturation are particularly useful as reactive solvents or diluents for alkyd resins and other drying oil-based surface coating compositions.

In a third major aspect, the invention related to various compositions that are derived by reaction 2,4-hexadienol with polyfunctional reactants. For instance, this aspect of the invention includes the esters of 2,4-hexadienol and polycarboxylic acids. Examples of such esters include the bis(2,4-hexadienyl) alkanedicarboxylates, bis(2,4-hexadienyl)cycloalkanedicarboxylate, bis(2,4 - hexadienyl) alkenedicarboxylates, bis(2,4-hexadienyl)cycloalkenedicarboxylate, bis(2,4 - hexadienyl)benzenedicarboxylates and the like such as:

bis(2,4-hexadienyl) oxalate
bis(2,4-hexadienyl) succinate
bis(2,4-hexadienyl) adipate
bis(2,4-hexadienyl) maleate
bis(2,4-hexadienyl) fumarate
bis(2,4-hexadienyl) phthalate
bis(2,4-hexadienyl) tetrahydrophthalate
bis(2,4-hexadienyl) cyclohexanedicarboxylate bis(2,4-hexadienyl) isophthalate
bis(2,4-hexadienyl) terephthalate
bis(2,4-hexadienyl) bicyclo[2.2.1]hept-2-en-5,6-dicarboxylate
and the like.

These diesters are preferably prepared by an ester exchange reaction between 2,4-hexadienol and a di(lower alkyl) ester of the diacid in the presence of a catalyst such as sodium methylate. (This type of reaction is well known in the art.) A direct esterification is not preferred because of the possibility of an allylic shift, as was explained above with respect to the first aspect of the invention. However, an alkylene oxide adduct of 2,4-hexadienol can be employed in place of the hexadienol per se, and diesters can be prepared from the adduct by direct esterification reactions with no danger of allylic shift.

The third aspect of the invention is also directed to bis(2,4-hexadienyl) carbonate which can be prepared, for instance by reacting one molar equivalent of diethyl carbonate with two molar equivalents of 2,4-hexadienol in the presence of an ester exchange catalyst such as soduim methylate.

The esters and carbonate that are within the third aspect of the invention are useful as co-reactants in drying oil-based surface coating compositions such as alkyd resins. The esters and carbonate can be epoxidized by reaction with peracetic acid to form epoxides that are useful in the preparation of molded articles, laminates, coatings, and the like, and as stabilizers for vinyl chloride polymers.

In a fourth major aspect, the invention relates to polymers that contain pendant 2,4-hexadienyl groups. Such polymers include substantially linear polymers that have been reacted with 2,4-hexadienol, with 2,4-hexadienal, or with one or more derivatives thereof.

One desirable class of polymers falling within the fourth major aspect of the invention are the polymers wherein the 2,4-hexadienyl moiety is bonded to the polymer chain through an ester group. Such polymers can be prepared by reacting 2,4-hexadienol or hydroxyl-containing derivative thereof with either a polymer containing pendant ester groups or a polymer containing pendant carboxylic acid or anhydride groups. The term "pendant group" refers to a group that bonded to, but does not form an integral part of, the polymeric chain or backbone. To illustrate, the ester groups in a polyester of a polyhydric alcohol and a polycarboxylic acid, and the ester groups in a polylacetone polymer, are part of the polymeric chain or backbone and are therefore not pendant. However, the ester groups in an acrylate polymer are pendant because they are appended to the polymeric chain.

Specific illustrative polymers falling within this class are those that are formed by reacting 2,4-hexadienol (or hydroxyl-substituted derivative thereof such as an alkylene oxide adduct) with a polymer containing moleic anhydride. The maleic anhydride reacts with 2,4-hexadienol or derivative thereof under relatively mild conditions to form the half-ester. The free carboxylic acid group can then be neutralized, such as by reacting it with an amine, or the acid group can be esterified by reaction with additional alcohol (preferably, however, not with the 2,4-hexadienol per se because of the possibility of an allylic shift, as was explained above). Among the maleic anhydride-containing polymers that can be used are maleic anhydride/vinyl chloride copolymer, ethylene/maleic anhydride copolymer, acrylonitrile/maleic anhydride copolymer, ethylene/propylene/maleic anhydride copolymer, vinyl chloride/vinyl acetate/maleic anhydride copolymer, styrene/maleic anhydride copolymer, and the like.

Another type of useful polymer falling within this class can be produced by reacting 2,4-hexadienol (or hydroxyl-containing derivative thereof such as 2-hydroxyethyl 2,4-hexadienyl ether or other alkylene oxide adduct of 2,4-hexadienol) with a polymer containing acrylic acid, methacrylic acid or esters thereof such as ethyl acrylate or methyl methacrylate. When the polymer contains free acid, and therefore requires a direct esterification, it is preferred to employ a derivative of 2,4-hexadienol in order to avoid the problem of allylic shift. When the polymer contains an acrylate or methacrylate ester, either 2,4-hexadienol or derivative can be used in the ester exchange reaction with excellent results. Among the polymers useful for reacting with 2,4-hexadienol or derivative thereof are ethylene/acrylic acid copolymer, ethylene/ethyl acrylate copolymer, ethyl acrylate homopolymer, methyl methacrylate homopolymer, ethylene/propylene/acrylic acid copolymer, ethylene/propylene/ethyl acrylate copolymer, vinyl chloride/ethyl acrylate copolymer, ethylene/methyl methacrylate copolymer, styrene/ethyl acrylate copolymer, acrylonitrile/styrene/ethyl acrylate copolymer, acrylonitrile/acrylic acid copolymer, vinyl chloride/acrylonitrile/acrylic acid copolymer, and the like.

In producing the polymers wherein the pendant 2,4-hexadienyl group is bonded to the polymer chain through an ester group, the proportion of 2,4-hexadienol or derivative thereof can vary widely. Normally, but not necessarily in all cases, when the polymer contains carboxylic acid groups, sufficient alcohol will be employed to react with all of the acid. However, when the polymer contains ester groups, in many cases only a small proportion of these groups will be ester exchanged with 2,4-hexadienol or derivative.

Another class of polymers which can be reacted with 2,4-hexadienol or derivative thereof are linear polymers containing pendant isocyanato groups. In such cases, the pendant 2,4-hexadienyl group will be bonded to the polymer chain through a urethane group. Among the polymers that contain isocyanato groups are vinyl chloride/bis(2-isocyanatoethyl) fumarate copolymer, vinyl chloride/5,6 - bis(2 - isocyanatoethyl) bicyclo[2.2.1]hept-2-enedicarboxylate copolymer, vinyl chloride/bis(2-isocyanatopropyl) fumarate copolymer, ethylene/bis(2-isocyanatoethyl) fumarate copolymer, acrylonitrile/bis(2-isocyanatoethyl) fumarate copolymer, and the like. The production of these useful polymeric compositions can be by standard procedures such as by heating the 2,4-hexadienol or hydroxyl-containing derivative with the isocyanato-containing polymer in a suitable inert solvent at a temperature of, for example, from 60–120° C. If desired, a catalyst such as stannous octoate or dibutyltin dilaurate can be used to accelerate the reaction.

Another type of polymer that is within the scope of the fourth aspect of the invention contains pendant 2,4-hexadienyl groups that are bonded to the polymeric chain through ether groups. Such polymers can be produced, for example, by reacting 2,4-hexadienol or hydroxyl-containing derivative thereof with a polymer containing pendant epoxide groups, or by reacting an alkali metal alcoholate of 2,4-hexadienol or hydroxyl-containing derivatives thereof with a polymer containing pendant halo groups. One useful type of polymer that contains pendant epoxide groups comprises the copolymers of allyl glycidyl ether. Such copolymers include vinyl chloride/allyl glycidyl ether copolymer, ethyl acrylate/allyl glycidyl ether copolymer, methyl methacrylate/allyl glycidyl ether copolymer, acrylonitrile/allyl glycidyl ether copolymer, styrene/allyl glycidyl ether copolymer, ethylene/allyl glycidyl ether copolymer, vinyl chloride/vinyl acetate/allyl glycidyl ether copolymer, and the like. Such copolymers can be prepared by conventional procedures such as by heating the monomers in the presence of a free radical catalyst. The copolymers that contain pendant epoxide groups can be reacted with 2,4-hexadienol or hydroxyl-containing derivative thereof by heating the reactants in a suitable inert solvent to a temperature of, for example, 50°–120° C. If desired, a catalyst such as a tertiary amine, boron trifluoride-amine complex, or the like can be employed to accelerate the reaction between epoxide and hydroxyl.

Polymers that contain pendant halo groups are illustrated by the copolymers of epichlorohydrin, epibromohydrin, chloroprene oxide, and the like with ethylene oxide, propylene oxide, butylene oxide, or mixtures thereof. These polymers can be reacted with the alkali metal alcoholates of 2,4-hexadienol or hydroxyl-containing derivative thereof in a reaction analogous to the Williamson ether synthesis. The polymer formed thereby contains a 2,4-hexadienyl group bonded to the polymeric chain through an ether group.

The polymers that contain pendant hexadienyl groups are widely useful as co-reactants with drying oils, alkyd resins, unsaturated polyester resins, and the like, in air drying coatings compositions and other coatings compositions that cure by polymerization of olefinic double bonds.

In a fifth major aspect, the invention relates to useful coatings compositions wherein a normally liquid derivative of 2,4-hexadienol or 2,4-hexadienal has replaced some or all of the solvent in a coatings composition that cures by polymerization of olefinic unsaturation. Such coatings compositions that are useful in this aspect of the invention include the paints, varnishes, and the like that are prepared from drying oils and/or drying oil derivatives such as alkyd resins, novolac-drying oil reaction products, reaction products of drying oil acids and epoxy resins, unsaturated polyester resins, and the like. All of such coatings compositions contain solvents such as mineral spirits, naphtha, aromatic hydrocarbons, turpentine, ketones, and the like. The solvents are normally evaporated into the atmosphere after the coating has been applied. This not only constitutes an economic loss, but also contributes to air pollution. It is an object of the fifth aspect of the invention to replace some or all of the solvent in such coatings compositions with relatively non-volatile, normally liquid derivatives of 2,4-hexadienol or 2,4-hexadienal. These derivatives copolymerize with the olefinic unsaturation, such as that found in a drying oil or drying oil derivative or in a unsaturated polyester, in the polymerization step, and thus can be viewed as being reactive solvents.

Any of the above-described derivatives of 2,4-hexadienol and 2,4-hexadienal that are relatively non-volatile and normally liquid can be employed in the coatings compositions of the fifth aspect of the invention. However, the di(2,4-hexadienyl) esters of dicarboxylic acids have been found to be particularly attractive for this purpose. Such diesters are illustrated by the bis(2,4-hexadienyl) alkanedicarboxylates, bis(2,4-hexadienyl) cycloalkanedicarboxylate, bis(2,4 - hexadienyl)alkenedicarboxylates, bis(2,4 - hexadienyl)cycloalkenedicarboxylate, bis(2,4-hexadienyl) benzenedicarboxylates and the like such as:

bis(2,4-hexadienyl) oxalate
bis(2,4-hexadienyl) succinate
bis(2,4-hexadienyl) adipate
bis(2,4-hexadienyl) maleate
bis(2,4-hexadienyl) fumarate
bis(2,4-hexadienyl) phthalate
bis(2,4-hexadienyl) tetrahydrophthalate,
bis(2,4-hexadienyl) cyclohexanedicarboxylate
bis(2,4-hexadienyl) isophthalate
bis(2,4-hexadienyl) terephthalate
bis(2,4-hexadienyl) bicyclo[2.2.1]hept-2-en-5,6-dicarboxylate and the like.

The fifth aspect of the invention is useful in the production of paints, varnishes, lacquers, and the surface coatings.

The examples which follow illustrate the invention.

EXAMPLE 1

2,4-hexadienyl acetate

To a liter, four neck, round bottomed flask equipped with stirrer, Dean-Stark trap, condenser and thermometer, was charged:

| | Grams |
|---|---|
| Isopropenyl acetate (5.94 moles) | 600 |
| 2,4-hexadienol (4.08 moles) | 400 |
| Sodium methylate | 4 |

The charge was heated to 70° C. for 4 hours with continuous removal of acetone (formed by rearrangement of isopropenyl alcohol). Excess isopropenyl acetate was removed by a roto-film evaporator after the catalyst had been neutralized by sulfuric acid. The residue from the evaporator was distilled on a spinning band column. The product was recovered as a distillate. Total yield was 171 grams. The product recovered boiled at 45–47° C. at 0.1–0.2 mm. of mercury absolute pressure. The infrared spectrum and the vapor phase chromatographic analysis was consistent with the assigned structure of the product having a relatively high purity.

EXAMPLE 2

2,4-hexadienyl N-methylcarbamate

To a mixture of 196 grams (2 moles) of 2,4-hexadienol and 400 grams of ethyl acetate in a glass flask equipped with stirrer, condenser, and thermometer, there was added dropwise 99.6 grams (1.75 moles) of methyl isocyanate. The addition took 30 minutes during which time the reaction mixture was maintained at 25° C. After the addition, the reaction mixture was refluxed for 4 hours at 70–80° C. The solvent was then removed by a roto-film evaporator leaving 266 grams of residue. The residue was distilled through a spinning band column yielding 176 grams of product. The infrared analysis was consistent with the assigned structure and the vapor phase chromatographic analysis indicated a relatively pure product with a small amount of unreacted hexadienol. The melting point of the product was 35° C.

EXAMPLE 3

1,3-dihydroxy-2-propyl 2,4-hexadienyl ether

To a glass reaction flask equipped with thermometer, stirrer, reflux condenser and addition funnel, there was charged 90 grams (0.92 mole) of 2,4-hexadienol and 0.675 gram of lithium acetate. Glycidol (29.6 grams; 0.4 mole) was added to the mixture dropwise over a period of 1 hour while maintaining the reaction mixture at 95° C. The reaction mixture was maintained at a temperature of 94–100° C. for an additional period of 1.25 hours. The reaction mixture was then washed with water to remove the lithium acetate catalyst. The water layer was extracted three times with diethyl ether, and these extracts were combined with the organic layer. The ether was removed by flash distillation, and the residue was distilled. Eleven grams of product boiling at 127° C. and 1 mm. of mercury pressure was obtained. Vapor phase chromatographic analysis showed an essentially pure product with small traces of hexadienol.

EXAMPLE 4

2-cyanoethyl 2,4-hexadienyl ether

A mixture of 2,4-hexadienol (196 grams; 2.0 moles) and 2 grams of a 40 percent aqueous solution of benzyltrimethylammonium hydroxide was placed in a 1-liter round bottomed flask equipped with a stirrer, Dean-Stark trap, condenser, and thermometer. To this mixture was added dropwise 106 grams (2.0 moles) of acrylonitrile over a period of 1 hour and 10 minutes while maintaining a temperature of 22–32° C. The mixture was maintained at 37–38° C. for an additional hour, and then 10 grams of acrylonitrile was added. The temperature was then maintained at 28–32° C. for another hour. Two grams of acetic acid was added to neutralize the catalyst.

The product was distilled through a spinning band column. 75 grams of material boiling at 56–60° C. and 2.2 to 2.5 mm. of mercury pressure was collected. The infrared analysis was consistent with the assigned structure.

*Analysis.*—Weight percent N: Found; 8.04. Calculated; 9.27.

EXAMPLE 5

Bis(2,4-hexadienyl) adipate

To a 1-liter, round-bottomed flask equipped with stirrer, Dean-Stark trap, thermometer, and condenser, there was charged 174 grams (1.0 mole) of dimethyl adipate, 392 grams (4 moles) of 2,4-hexadienol, and 5.66 grams of sodium methylate. The mixture was heated at 105–125° C. while continuously removing methanol over a period of 1 hour. A total of 60 grams of methanol was removed. Acetic acid (12.6 grams) was added to neutralize the catalyst. Two hundred grams of n-heptane was added after the mixture had been cooled to 50° C. Hi-Flo filter aid was added and the mixture was filtered. Two percent Darco activated charcoal was added to the filtrate, and the mixture was heated to 70° C. on a steam bath and refiltered. Acetic acid, n-heptane, and excess hexadienol were stripped off under reduced pressure to yield a residue product. The product had a Gardner viscosity of A–3, and a saponification equivalent of 156.1 (theory=153).

EXAMPLE 6

Bis(2,4-hexadienyl) phthalate

By a procedure analogous to that described in Example 6, a diester was prepared by an ester exchange reaction between 194 grams (1.0 mole) of dimethyl phthalate, and 392 grams (4.0 moles) of 2,4-hexadienol with 5.86 grams of sodium methylate as catalyst. After the ester exchange reaction (which was carried out at 105–148° C. for 35 minutes), the product was diluted with n-heptane and water. After separating the water layer, the product was washed three times with 100 ml. portions of water. Anhydrous sodium sulfate was added to the product to remove water, and the mixture was filtered. The n-heptane and excess hexadienol was removed by distillation to a kettle temperature of 125° C. at 1 mm. pressure. The product was collected as a residue (266 grams). The saponification equivalent weight was 161.5.

EXAMPLE 7

1-(2-hydroxyethoxy)-2,4-hexadiene

A solution of 1.1 g. of potassium hydroxide in 980 g. (10.0 moles) of 2,4-hexadienol was placed in a three-liter stainless steel autoclave. Then the autoclave was sealed and 92 g. of butane was pumped in as a diluent. The contents of the autoclave were heated to 100° C. at which time the pressure was 75 p.s.i.g. Then 533 g. of ethylene oxide was pumped into the autoclave slowly during a period of 38 minutes. This rate was just sufficient to maintain the reaction temperature of 100° C. without external heat being required. The temperature was kept at 100° C. until the pressure of the autoclave dropped to 80 p.s.i.g. Then the pressure was released and the reaction mixture (1513 g.) was emptied from the autoclave.

By gas chromatography the reaction mixture was found to contain 25% unreacted hexadienol, 48% of the desired product, 1-(2-hydroxyethoxy)-2,4-hexadiene, and 27% of the 2,4-hexadienyl ether of diethylene glycol.

EXAMPLE 8

1,1-diethoxy-2,4-hexadiene

A solution of three grams of ammonium nitrate in 50 ml. of absolute ethyl alcohol was added slowly to a mixture of 76 g. of hexadienol and 144 g. of triethyl orthoformate. The mixture was stirred for six hours at room temperature. The mixture was filtered and four grams of sodium carbonate was added to the filtrate.

The product was fractionally distilled in a spinning band distillation apparatus to yield 109 g. of 1,1-diethoxy-2,4-hexadiene boiling at 74° C. at 1.3 mm. Hg. This product had a density of .8708 g./ml. at 25° C. and a refractive index of $1.4538_D{}^{30}$. Infrared analysis of the product was consistent with the assigned structure.

*Analysis.*—Calculated (percent): C, 70.55; H, 10.66; O, 18.79. Found (percent): C, 70.43; H, 10.65; O, 18.92.

Mass spectrographic analysis of the product showed it to be of high purity with a molecular weight of 170.

EXAMPLE 9

To a solution of 50.8 g. of a medium oil length (48%) fast-drying soya alkyd (sold under the trade name Renzyl 435–1) in 48.2 g. of mineral spirits was added 50.8 g. of bis(2,4-hexadienyl) phthalate. To this mixture was added 0.01 g. of cobalt, as cobalt octoate, 1.0 g. of lead, as lead octoate, and 5 g. of a 60% solution of methyl ethyl ketone hydroperoxide in dimethyl phthalate.

A 1.5 mil film of this solution was cast on a panel of phosphate passivated steel. The drying times were measured according to Federal Test Method Standard No. 141, Method 4061. The film was dry to touch in 150 minutes, cotton free in 185 minutes, and paper free in 205 minutes. After seven days of drying at room temperature the film had a Sward hardness of 16 and a pencil hardness of 2B. It could withstand an impact of 20 in. lbs. on its face and 10 in. lbs. on the back of the panel without cracking. The film passed the ⅛″ to 1″ conical mandrel test and displayed excellent adhesion. The film was unchanged by exposure to 1% sulfuric acid or water for four hours. Exposure to 2% sodium hydroxide for 4 hours softened the film slightly and produced a few small blisters.

A 1.5 mil film of the same alkyd solution but without the hexadienyl phthalate also was cast on a panel of phosphate-passivated steel. The film was dry to touch in 285 minutes, cotton free in 365 minutes, and paper free in 385 minutes. After seven days of drying at room temperature the film had a Sward hardness of 4 and a pencil hardness of 5B. It could withstand an impact of 100 inch pounds on its face and 80 inch pounds on the back of the panel without cracking. The film passed the ⅛″ to 1″ conical mandrel test and displayed good adhesion. The film was unchanged by exposure to water for four hours. Exposure to 1% sulfuric acid for four hours caused a slight blush and softening. Exposure to 2% sodium hydroxide for four hours dissolved the film.

EXAMPLE 10

A 50 g. sample of a thermoplastic acrylic resin sold under the tradename Acryloid B–66 was dissolved in a mixture of 50 g. of bis(2,4-hexadienyl) phthalate and 50 g. of methyl isobutyl ketone. To this mixture was added 0.01 g. of cobalt, as cobalt octoate, 1.0 g. of zirconium, as a zirconium chemical complex, and 5 g. of a 60% solution of methyl ethyl ketone hydroperoxide in dimethyl phthalate.

A 1.5 mil film of this solution was cast on a panel of phosphate-passivated steel. The drying times were measured according to Federal Specification Standard No. 141, Method 4061. The film was set to touch in 90 minutes, cotton free in 110 minutes, and paper free in 120 minutes. After drying for 7 days at room temperature the film had a Sward hardness of 37 and a pencil hardness of HB. It could withstand 5 in. lbs. of impact on its face but less than 5 in. lbs. of impact on the back of the panel without cracking. The film passed the ⅛″ to 1″ conical mandrel test and displayed excellent adhesion. The film was unchanged by exposure to water or 1% sulfuric acid for 4 hours. It blushed slightly when exposed to 2% sodium hydroxide for 4 hours.

A solution of 50 g. of the same acrylic polymer in 100 g. of methyl isobutyl ketone was activated with the same driers and applied as a 1.5 mil on a panel of phosphate passivated steel. The film was set to touch in 60 minutes, cotton free in 70 minutes, and paper free in 85 minutes. After drying for 7 days at room temperature the film had a Sward hardness of 28 and a pencil hardness of HB. It could withstand an impact of 10 inch pounds on its face and less than 5 inch pounds on the back of the panel without cracking. The film passed the conical mandrel test and displayed excellent adhesion. Exposure of the film to water or 1% sulfuric acid for 4 hours produced slight blushing and softening. Exposure to 2% sodium hydroxide for 4 hours produced moderate to heavy blushing and blistering.

EXAMPLE 11

A 40 g. sample of an unsaturated polyester of phthalic and maleic acids was dissolved in a mixture of 40 g. of bis(2,4-hexadienyl) phthalate and 20 g. of methyl isobutyl ketone. A 1.5 mil film of this solution was cast on a panel of phosphate-passivated steel and baked for 4 hours at 80° C.

The resultant coating had a Sward hardness of 52 and a pencil hardness of 2H. It could withstand an impact of 10 inch pounds on its face and 5 inch pounds on the back of the panel without cracking. It failed to pass the ⅛″–1″ conical mandrel test but it was found to have excellent adhesion to the panel. After exposure to 1% sulfuric acid for 24 hours or to boiling water for 1 hour the coating was unchanged. Exposure of the coating to 20% sodium hydroxide for 24 hours caused a slight softening of the film and some small blisters.

A 1.5 mil film of a 67% solution of the unsaturated polyester in methyl isobutyl ketone was cast on a panel of phosphate-passivated steel. The panel was baked for 4 hours at 80° C. The resultant coating had a pencil hardness of HB. It could withstand an impact of 10 inch pounds on its face and 5 inch pounds on the back of the panel without cracking. It failed to pass the ⅛″–1″ conical mandrel test. It was found to have good adhesion to the panel. Exposure of the film to either 20% sodium hydroxide or 1% sulfuric acid for 24 hours completely dissolved the film. Immersion of the coated panel in boiling water for 1 hour also removed the film.

What is claimed is:

1. A composition of the formula:

$$CH_3(CH=CH)_2CH_2O-(R^2O)_nR^1$$

wherein n represents zero or a positive number, wherein $R^2$ represents alkylene of from 2 to 4 carbon atoms, and wherein $R^1$ is formyl, carbonylalkyl, carbonylalkenyl, hydroxyl-substituted carbonylalkenyl, carbonylakadienyl, carbonylalkatrienyl, carbonylalkatetraenyl, carbonylaryl, carbonylcycloalkyl, carbonylalkaryl, carbonylcycloakenyl, carbonylbicyclo[2.2.1]-heptenyl, carbonylcarboxy, carbonylalkylcarboxy, carbonylalkenylcarboxy, carbonylarylcarboxy, carbonylalkylenehydroxy, carbonylalkyleneamino, N-alkylcarbamyl, N-arylcarbamyl, hydroxylalkyl, cyanoethyl or dihydroxyalkyl.

2. Composition of claim 1 wherein said composition is 2,4-hexadienl N-methylcarbamate, 1,3-dihydroxy-2-propyl 2,4-hexadienyl ether, 2-cyanoethyl 2,4-hexadienyl ether, or 1-(2-hydroxyethoxy)-2,4-hexadiene.

3. A curable coatings composition comprising (a) an ester selected from the group consisting of bis(2,4-hexadienyl) alkanedicarboxylate, bis(2,4-hexadienyl) cycloalkanedicarboxylate, bis(2,4-hexadienyl) alkenedicarboxylate, bis(2,4-hexadienyl) cycloalkenedicarboxylate, and bis(2,4-hexadienyl) benzenedicarboxylate, and (b) a member selected from the group consisting of a natural drying oil, a natural drying oil acid-based alkyl resin, a reaction product of a novolac and a natural drying oil, a reaction product of a natural drying oil acid and an epoxy resin, and a polyester of a dicarboxylic acid and a dihydric alcohol wherein said polyester contains olefinic unsaturation.

4. A coatings polymer resulting from the reaction of an ester selected from the group consisting of bis(2,4-hexadienyl)alkanedicarboxylate, bis(2,4 - hexadienyl)-cycloalkanedicarboxylate, bis(2,4-hexadienyl)alkenedicarboxylate, bis(2,4 - hexadienyl)cycloalkenedicarboxylate, and bis(2,4-hexadienyl)benzenedicarboxylate with a member selected from the group consisting of a natural drying oil, a natural drying oil acid-based alkyd resin, a reaction product of a novolac and a natural drying oil, a reaction product of a natural drying oil acid and an epoxy resin, and a polyester of a dicarboxylic acid and a dihydric alcohol wherein said polyester contains olefinic unsaturation.

References Cited

UNITED STATES PATENTS

| | | | |
|---|---|---|---|
| 1,695,566 | 12/1928 | Turkington | 260—31.8 |
| 1,720,051 | 7/1929 | Norton | 260—31.8 |
| 1,793,667 | 2/1931 | Baldwin | 260—31.8 |
| 2,957,837 | 10/1960 | Smith et al. | 260—31.8 |
| 3,012,993 | 12/1961 | Rogan | 260—77.5 |
| 3,255,214 | 6/1966 | Phillips et al. | 260—615 |
| 3,277,050 | 10/1966 | Pettigrew | 260—31.8 |

FOREIGN PATENTS 527,255 7/1956 Canada.

OTHER REFERENCES

Chemical Abstracts, vol. 51, No. 20, Oct. 25, 1957, p. 15,402 ab.

Chemical Abstracts, vol. 55, No. 21, Oct. 16, 1961, p. 20,928h.

Chemical Abstracts, vol. 58, No. 10, May 13, 1963, p. 10,066h.

DONALD E. CZAJA, Primary Examiner

R. W. GRIFFIN, Assistant Examiner

U.S. Cl. X.R.

260—22, 31.8, 32.8, 33.6, 45.85, 398, 475, 485, 614, 615, 836, 860, 875, 881; 117—132, 134, 161, 167; 424—167